United States Patent
Arrigoni et al.

(10) Patent No.: US 7,043,911 B2
(45) Date of Patent: May 16, 2006

(54) VEHICLE BRAKING SYSTEM MASTER CYLINDER

(75) Inventors: Riccardo Arrigoni, Gorgonzola (IT); Roberto Malagoli, Ranica (IT)

(73) Assignee: Freni Brembo S.p.A., Curno (IT)

( * ) Notice: Subject to any disclaimer, the term of this patent is extended or adjusted under 35 U.S.C. 154(b) by 127 days.

(21) Appl. No.: 10/476,288

(22) PCT Filed: Jun. 30, 2003

(86) PCT No.: PCT/IT03/00408

§ 371 (c)(1),
(2), (4) Date: Oct. 29, 2003

(87) PCT Pub. No.: WO2004/022399

PCT Pub. Date: Mar. 18, 2004

(65) Prior Publication Data

US 2005/0138927 A1    Jun. 30, 2005

(30) Foreign Application Priority Data

Sep. 5, 2002    (WO) ..................... PCT/IT02/00568

(51) Int. Cl.
*B60T 11/224*    (2006.01)
(52) U.S. Cl. .............. 60/578; 60/562; 60/591
(58) Field of Classification Search .............. 60/562, 60/575, 576, 578, 586, 591, 453, 454
See application file for complete search history.

(56) References Cited

U.S. PATENT DOCUMENTS

| | | | | | |
|---|---|---|---|---|---|
| 1,958,722 A | * | 5/1934 | Sinclair et al. | ............... | 60/576 |
| 2,093,543 A | * | 9/1937 | Bowen | ..................... | 60/578 |
| 3,667,229 A | * | 6/1972 | Cresto | ..................... | 60/578 |
| 3,910,047 A | * | 10/1975 | Grabb | ..................... | 60/554 |
| 3,911,681 A | * | 10/1975 | Sisco | ..................... | 60/553 |
| 3,937,021 A | * | 2/1976 | Sisco et al. | ..................... | 60/575 |
| 4,027,482 A | * | 6/1977 | Manzini | ..................... | 60/574 |
| 4,348,161 A | * | 9/1982 | Shibata | ..................... | 60/591 |
| 4,455,831 A | * | 6/1984 | Maehara | ..................... | 60/574 |
| 6,276,137 B1 | * | 8/2001 | Kottmyer et al. | ............. | 60/591 |

FOREIGN PATENT DOCUMENTS

| | | | |
|---|---|---|---|
| DE | 2436808 A | * | 2/1976 |
| DE | 3631683 A1 | * | 3/1988 |

* cited by examiner

Primary Examiner—Thomas E. Lazo
(74) Attorney, Agent, or Firm—Hogan & Hartson LLP

(57) ABSTRACT

A master cylinder suitable for a vehicle braking system has an unusual capability to supply quantities of fluid and fluid pressures at its output in differentiated manner in dependence on the braking stage, preventing long transitory stages between an approach stage and an actual braking stage. The cylinder comprises a cylinder body having a first chamber and a second chamber provided inside. The first chamber is in operative communication with at least one braking member and houses a first piston. The second chamber, which has larger transverse dimensions than the first chamber, is in operative communication with the first chamber and houses a second piston. Ducts are provided and put the first chamber and the second chamber into communication during the approach stage. The ducts house a low-pressure valve which is open during the approach stage and closed during the actual braking stage.

53 Claims, 7 Drawing Sheets

VEHICLE BRAKING SYSTEM MASTER CYLINDER

FIELD OF THE INVENTION

The subject of the present invention is a master cylinder for a vehicle braking system.

BACKGROUND OF THE INVENTION

The present invention relates particularly to a so-called differential cylinder, that is, a cylinder which enables the amount of fluid at the output and its pressure to be varied in dependence on the braking stage, as will be described below and as described, for example in U.S. Pat. No. 4,455,831, GB 359142, DE 2436808, U.S. Pat. No. 2,093,543, DE 3631683 and U.S. Pat. No. 1,958,722.

As is self-evident, braking systems operate at least between a rest condition and a working condition which are defined, respectively, by the absence or by the presence of a predetermined braking force applied to the members of the system by actuating means.

Irrespective of the type of braking system, the transition from the rest condition to the working condition comprises a first stage for taking up clearance and a second actual braking stage.

With reference, for example, to hydraulically-operated braking systems, during the stage for taking up clearance, the travel performed by the actuating means is quite large and the pressure is low. In contrast, during the actual braking stage, the travel performed by the actuating means is quite small and the pressure is high.

With reference to braking systems of the type with disc brakes, a disc is mounted on the hub of the vehicle wheel and a caliper, provided with pads, is mounted on a fixed portion of the vehicle, for example, on the suspension, and is arranged astride the disc. By way of example, for a so-called fixed caliper, the caliper has cylinder-piston units disposed on both sides of the disc so that the respective pistons act on the pads, pressing them against the disc to achieve the desired braking action.

When the braking system is in the rest condition, the pads are disposed at a distance from the disc such as to allow free rotation of the disc and not to give rise to so-called residual-torque phenomena. Upon completion of the braking operation, the pistons are therefore retracted inside the cylinders by a distance, generally known by the term "rollback", such as to permit the desired detachment of the pads from the disc.

It is therefore clear that, during the transition from the rest condition to the working condition of the braking system, the pistons which act on the pads perform, in the first place, a travel which causes the pads to approach the surface of the disc, that is, a travel during which the distance (the rollback) between the pads and the disc is taken up.

In these braking systems, the cylinder-piston units of the caliper are arranged to be connected to a master cylinder which in turn is connected to a control device, for example, constituted by the brake pedal provided inside the passenger compartment.

The approach travel of the pads in order to exert the braking force on the vehicle wheels translates into an approach travel of the master cylinder, that is, into a travel which is lost for the purposes of the braking action. Similarly, the approach travel of the master cylinder translates into a corresponding travel of the brake pedal, during which the pedal does not generate the desired braking force.

Naturally, the approach travel of the pads, together with the consequent loadless travel of the pedal master cylinder, adversely affect the promptness of the response of the brake and this effect is more noticeable the greater the sensitivity of the user and the higher the performance of the vehicle, as in racing cars or, in any case, vehicles for sports uses.

There is therefore a need, on the one hand, to limit the approach travel of the pedal whilst nevertheless supplying a large amount of fluid to the cylinder-piston units housed in the caliper. This need could be solved by providing a master cylinder with a large-diameter piston. On the other hand, however, there is a need to limit the force which must be applied to the brake pedal in order to achieve a predetermined pressure. This need could be solved by providing a master cylinder with a piston of limited diameter.

These conflicting needs are solved simultaneously by providing a master cylinder, known as a differential cylinder, which has a cylindrical cavity having two portions with different diameters, in each of which a corresponding piston slides.

This cylinder therefore has two chambers with different diameters for performing two distinct functions. During the stage of the approach travel of the pads, the larger-diameter chamber is operative and can supply a large quantity of fluid to the brakes whilst keeping the travel of the brake pedal short. During the actual braking stage, the smaller-diameter chamber is operative and enables high pressures of the fluid to be achieved and large braking forces therefore to be exerted whilst the control force on the brake pedal is kept low. The transition from one function to the other takes place when a predetermined pressure value (for example 5 bar) is reached, and is brought about by the opening of a discharge valve by means of which the larger-diameter chamber is put into communication with ambient pressure, for example, from the brake fluid reservoir. An example of a differential cylinder as described briefly above is given, for example, in U.S. Pat. No. 1,958,722. The larger-diameter chamber is put into communication with the reservoir by means of ducts formed in the structure of the cylinder body. The discharge valve is housed inside the ducts, and hence inside the body of the master cylinder.

Further constructions, in which the discharge valve which renders the larger-diameter chamber inactive is housed inside the pistons, for example, inside the rod of the larger-diameter piston, are described and illustrated in GB 359142, DE 2436808, U.S. Pat. No. 2,093,543 and DE 3631683.

The above-mentioned patents describe differential cylinders in which the smaller-diameter piston has some ducts parallel to the axis of sliding of the pistons. Moreover, the seal between the smaller-diameter piston and the respective chamber is ensured by a lipped seal which adheres to the walls of the chamber as a result of the pressure established therein.

During the stage in which the larger-diameter chamber is active, it is known, for example, as described in the patents cited above, for the brake fluid to pass from the larger-diameter chamber to the smaller-diameter chamber through the ducts formed in the smaller-diameter piston and between the walls and the lipped seal, which is not yet adhering to the walls.

When the "rollback" and the clearance have been taken up, the larger-diameter piston is deactivated by the opening of the discharge valve and the lipped seal of the smaller-diameter piston adheres to the walls of its chamber which is isolated from the larger-diameter chamber, permitting an increase in the pressure which causes the pads to be thrust against the disc in order to exert the braking force on the vehicle.

The transitory stage between the deactivation of the larger-diameter chamber and the activation of the smaller-diameter chamber has to be kept to the minimum since it corresponds to an "idle" period of time which could instead be used for the delivery of brake fluid under pressure.

Moreover, the duration of the transitory stage depends on the promptness of the response of the lipped seal which, unfortunately, is not optimal, because it is also designed so as to be suitable for forming the seal against the walls of the respective chamber. This translates into a sensation in the brake pedal of a "step", which is particularly disagreeable for sports cars or even racing cars.

A further disadvantage of known cylinders arises when, owing to the pressure established in the smaller-diameter chamber, the lipped seal is extruded through the axial holes in the smaller-diameter piston. Attempts have been made to prevent this problem by inserting a ring between the lipped seal and the respective piston, but the solution is not optimal since it is a further factor which contributes to increase "idle" time.

It is known from U.S. Pat. No. 4,455,831 to produce a differential cylinder provided with valve means which are separate from the lipped seal of the smaller-diameter piston and which put the two chambers into communication.

Finally, a two-part piston inside which two separate valves are housed is known from U.S. Pat. No. 3,667,229. A first valve is disposed in a duct inside the piston, which connects the smaller-diameter chamber with the larger-diameter chamber. A second valve is disposed in a duct which connects the larger-diameter chamber with an environment that is in communication with the reservoir. The piston is provided in two portions and each houses a respective valve.

The two valves are separate from one another and each has to be mounted, separately from the other, inside the respective portion of the piston. This leads to problems in the production of the two portions, both of which have to be precision machined in order to house the respective valve correctly, and to problems during assembly, in particular rendering assembly quite complex.

The object of the present invention is to devise and to provide a master cylinder for a vehicle braking system which permits differential operation and, at the same time, overcomes the disadvantages mentioned with reference to the prior art.

SUMMARY OF THE INVENTION

Objects according to various embodiments of the present invention are achieved by means of a master cylinder for a vehicle braking system. The master cylinder comprises a cylinder body having a first chamber and a second chamber provided inside. The first chamber is in operative communication with at least one braking member and houses a first piston. The second chamber, which has larger transverse dimensions than the first chamber, is in operative communication with the first chamber and houses a second piston. Ducts are provided and put the first chamber and the second chamber into communication during the approach stage. The ducts house a low-pressure valve which is open during the approach stage and closed during the actual braking stage.

BRIEF DESCRIPTION OF THE DRAWINGS

Further characteristics and the advantages of the master cylinder will become clear from the following description of preferred embodiments thereof, given by way of non-limiting example, with reference to the appended drawings, in which.

DETAILED DESCRIPTION OF THE INVENTION

Figure 1:
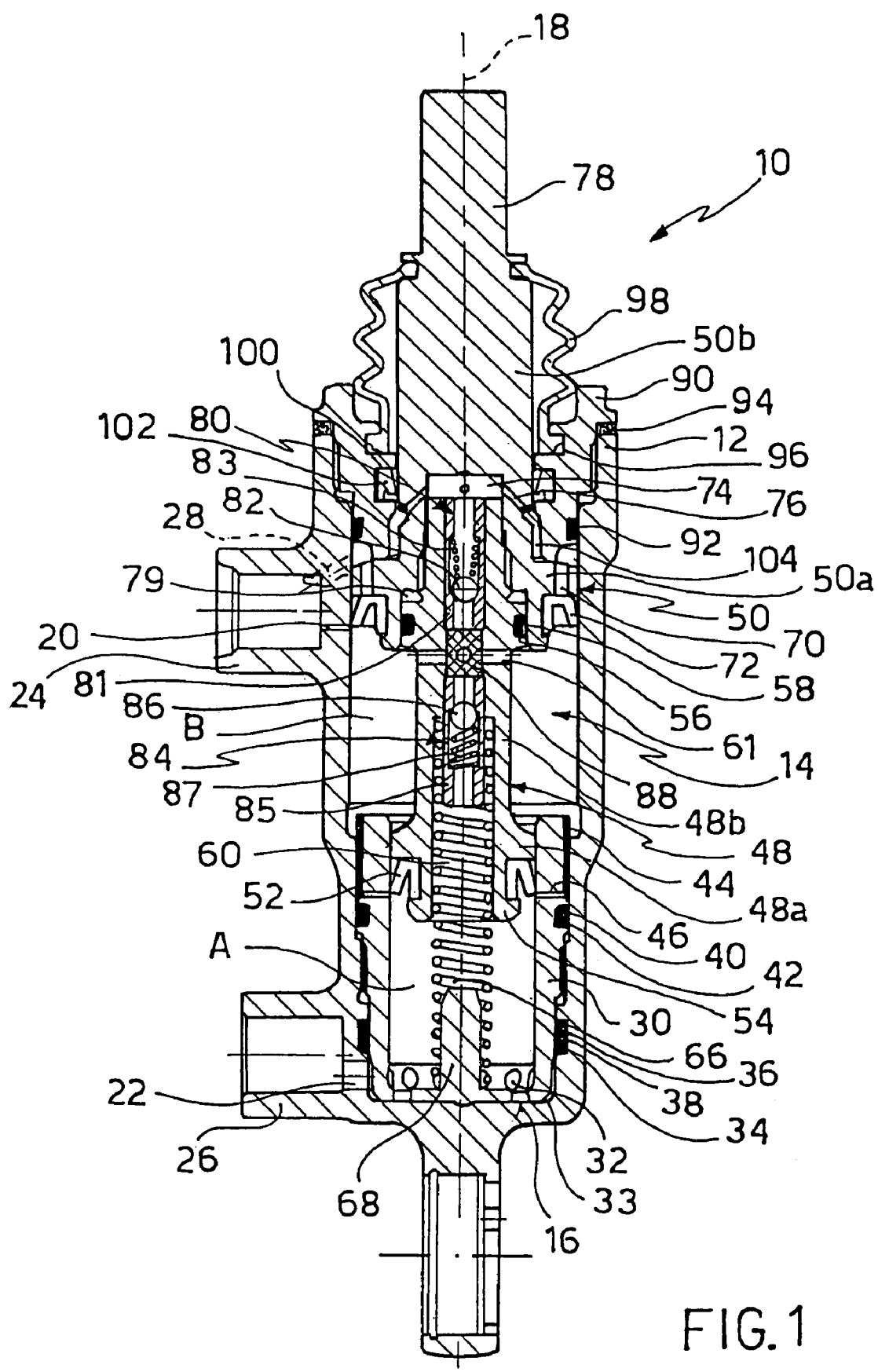
FIG. 1 shows a master cylinder according to the present invention, sectioned in a plane containing the axis of sliding of the piston and in rest conditions.

With reference to the above-mentioned drawings and in particular to FIG. 1, a master cylinder of a vehicle braking system is generally indicated 10.

The cylinder 10 comprises a body 12 inside which there is a cavity 14 having one open end and the other end closed by a base 16.

The cavity 14 extends along a longitudinal axis 18 and has cylindrical portions with different diameters. In the embodiment of FIG. 1, the cavity 14 has substantially a first cylindrical portion which extends from the base 16 and a second cylindrical portion which extends from the first portion to the free end of the cavity. The first portion has a slightly smaller diameter than the second portion.

The body 12 has an inlet duct 20 and an output duct 22 which are put into communication with the interior of the cavity 14 and, in particular, with the second, larger-diameter portion and with the first, smaller diameter portion, respectively. According to a possible embodiment, both of the ducts preferably extend substantially radially relative to the body 12. Moreover, the output duct 22 is formed in the vicinity of the base 16.

According to a possible embodiment, in the region of the inlet duct 20, the body 12 has a seat 24 suitable for housing appropriate elements for connection to a brake-fluid reservoir, not shown. Similarly, according to one embodiment, in the region of the output duct 22, the body 12 has a further seat 26 which may be suitably threaded and which can be put into communication with actuating means, not shown, for example, constituted by cylinder-piston units of disc-brake calipers.

According to a possible embodiment, the body 12 comprises at least one further duct 28 suitable for putting the seat 24 and the second portion of the cavity 14 into communication.

According to a possible embodiment shown in FIG. 1, a cylindrical bush 30, preferably suitable for abutting the surface of the base 16 inside the body 12, is inserted in the cavity 14, coaxially therewith. The bush 30 is perforated axially and extends along the first portion of the cavity 14, further reducing its diameter inside the body 12.

According to a possible embodiment, the wall of the bush has radial holes 32 distributed around a circumferential portion in the vicinity of the end which abuts the surface of the base 16.

The outside diameter of the bush 30 is reduced in the region of the circumferential portion in which the radial holes 32 are distributed. A small annular chamber 33 is thus created between the walls of the cavity 14 and the bush 30 in the region of the radial holes 32, and is put into communication with the output duct 22. According to a possible embodiment, starting from the end which is intended to abut the base 16, the outer surface of the bush 30 also has cylindrical sealing portions and threaded portions for cooperating with corresponding threaded portions formed in the surface of the first portion of the cavity 14.

In the embodiment of FIG. 1, a first cylindrical sealing portion of the bush 30 is intended to cooperate with a sealing ring 34 associated with an anti-extrusion ring 36, both housed in a seat 38 in the cylinder body. According to a possible embodiment, the bush 30 comprises a second cylindrical sealing portion provided with a seat 40 suitable for housing a further sealing ring 42.

According to a possible embodiment, the end of the bush 30 remote from that which is intended to abut the base 16 has some axial grooves 44 formed in the outer surface of the bush 30, that is, in the surface which directly faces the surface of the cavity 14. The grooves 44 extend longitudinally from the end of the bush 30 remote from that which is intended to abut the base 16 and are put into communication with the interior of the bush 30 by means of radial holes 46.

In the embodiment of FIG. 1, four grooves are provided, and are distributed uniformly circumferentially.

A first piston for sliding inside the bush 30 is indicated 48 and a second piston for sliding inside the second, larger-diameter portion of the cavity 14, is, indicated 50.

According to a possible embodiment, the first piston 48 is formed, in a single piece, by a thrust portion 48a and by a rod 48b. The thrust portion 48a has a flange-shaped head having transverse dimensions substantially corresponding to the inside transverse dimensions of the bush 30.

A seat is also provided for housing sealing means, for example, formed by a first primary seal 52, restrained by a ring or by an undercut 54.

According to a possible embodiment, the rod 48b has, at the end remote from the thrust portion 48a, a portion suitable for coupling with the second piston 50.

Externally and in a direction away from the thrust portion 48a, this coupling portion comprises a flanged portion, which acts as a shoulder for a threaded portion, and a cylindrical portion. The flanged portion has a seat 56 for a sealing ring 58.

According to a possible embodiment, the rod 48b is hollow axially, that is, it has an axial hole 60 which extends throughout its length and is open at both ends. According to a possible embodiment, the rod 48b also comprises ducts 61, preferably radial ducts, for example, disposed between the thrust portion 48a and said flanged portion. The radial ducts 61 are put into communication with the axial hole 60.

The thrust portion 48a of the first piston 48, the inside wall of the bush 30, and the base 16 define a first chamber A or high-pressure chamber which opens into the output duct 22.

A return spring, indicated 66, is housed in the first chamber A and partially inside the axial hole 60, operating between the base 16 and the first piston 48. According to a possible embodiment, the return spring 66 has a guide element 68 bearing on the surface of the base 16.

According to a possible embodiment, the second piston 50 is formed, in a single piece, by a thrust portion 50a and by a rod 50b. The thrust portion 50a comprises a flange-shaped head having transverse dimensions substantially corresponding to the transverse dimensions of the second portion of the cavity 14. Axial through-holes formed in the thrust portion 50a of the second piston 50 are indicated 70.

A second primary seal 72 is housed in a seat of the thrust portion 50a of the second piston 50, in contact with one end of each axial hole 70 and arranged in a manner such as to adhere to the walls of the cavity 14. According to a possible embodiment, a ring, not shown, may be provided between the primary seal 72 and the flange-shaped head of the piston, to prevent the seal being extruded through the axial holes 70 because of the pressure.

According to a possible embodiment, an axial hole 74 is formed in the head which constitutes the thrust portion 50a and has portions with different diameters for housing the coupling portion of the first piston 48. According to the embodiment shown in FIG. 1, there may be a first cylindrical portion for cooperating with the sealing ring 58 of the first piston 48, a threaded portion for cooperating with the corresponding threaded portion of the first piston 48, and a second cylindrical portion which houses the final cylindrical portion of the first piston 48 and terminates in a base surface. Some ducts 76 extend from the second cylindrical portion and through the whole thickness of the wall of the rod 50b, opening outside it.

According to a possible embodiment, a shank 78 is provided at the end remote from the thrust portion 50a, for example, a threaded shank for coupling with the control pedal.

According to a possible embodiment, the first piston 48 and the second piston 50 are fixed firmly to one another, as shown, for example, in FIG. 1. When the two pistons are assembled, shims 79 may be interposed between the flanged portion of the first piston and a corresponding shoulder in the axial hole 74 of the second piston so as to define precisely the position of the two pistons relative to one another. This relative position depends on the distance between the inlet duct 20 and the radial ducts 46.

As shown in FIG. 1, when the two pistons are assembled, the axial hole 60 opens into the base portion of the axial hole 74 and is put into communication with the ducts 76.

The thrust portion 48a of the first piston 48, the thrust portion 50a of the second piston 50, and the inside wall of the second portion of the cavity 14 define a second chamber B or low-pressure chamber which, as shown in FIG. 1, is put into communication with the inlet duct 20.

According to a possible embodiment, first valve means are housed in the axial hole 60 between the radial ducts 61 and the end for coupling with the second piston 70. In one possible embodiment shown, for example, in FIG. 1, the first valve means comprise a discharge valve 80. According to a possible embodiment, the discharge valve 80 comprises an independent cylinder 81 suitable for being fitted in the axial hole 60 and for expanding against the walls of the axial hole, forming an interference coupling. The cylinder 81 houses a sphere 82 which defines the valve-closure element and a spring 83 which keeps the valve closed until a predetermined threshold pressure p' is reached inside the low-pressure chamber B, preventing brake fluid flowing from the radial ducts 61 to the ducts 76 below this value. According to a possible embodiment, the discharge valve is calibrated to open at a pressure equal to a threshold value p' of about 5 bar.

According to a possible embodiment, further valve means are provided, for example, fitted in the axial hole 60. According to a possible embodiment, the further valve means comprise a low-pressure valve 84 fitted in the axial hole 60 between the radial ducts 61 and the high-pressure chamber A.

In one possible embodiment, for example, shown in FIG. 1, the low-pressure valve 84 comprises an independent cylinder 85 suitable for being fitted in the axial hole 60 and for expanding against the walls of the axial hole, forming an interference coupling. According to a possible embodiment, the cylinder 85 houses a sphere 86 which defines the valve-closure element and a spring 87 which keeps the valve in position until a predetermined threshold pressure p" is reached inside the low-pressure chamber B.

According to a possible embodiment, the low-pressure valve is open from the start, and hence from a substantially ambient pressure value, until the pressure p inside the second chamber reaches the threshold value p' (5 bar), that is, until the discharge valve 80 opens and the pressure P inside the first chamber A exceeds the pressure p inside the second chamber B. According to a further embodiment, the low-pressure valve 84 is calibrated to open as soon as the pressure rises slightly above ambient pressure, for example, to a threshold value p" of about 0.1 bar, and remains open until the pressure P inside the first chamber A exceeds the pressure p inside the second chamber B.

The low-pressure valve 84 defines valve means which are separate from the primary seal 52 and which can put the two chambers A and B into communication in a first stage and can close communication between the two chambers in a second stage.

According to a possible embodiment, a filter 88 is interposed between the two valves, at the confluence of the radial ducts 61.

To complete the differential cylinder 10, a ring nut 90 is screwed into the open end of the cavity 14 and retains and guides the two pistons. This ring nut has an outer cylindrical portion in which a seat for a sealing ring 92 is defined, a threaded portion for securing to the cylinder body 12, and a collar which forms an abutment shoulder for the end surface of the cylinder body 12. When the ring nut is screwed into the cylinder body, shims 94 can be inserted between the collar of the ring nut and the end surface of the body 12.

The ring nut 90 also provides a seat 96 for the engagement of a protective boot 98 which is closed onto the rod of the second piston, and a further seat 100 for a sealing ring 102.

According to a possible embodiment, an internal cylindrical cavity is also provided and has a diameter slightly greater than the diameter of the rod 50b of the second piston 50 so as to form a chamber 104. The chamber 104 is put into communication with the duct 28. The chamber 104 is also put into communication with the ducts 76, and hence with the axial hole 60 and, when the valve 80 is in the open position, also with the radial ducts 61 and the second chamber B or low-pressure chamber.

The end of the ring nut which is inside the body 12 constitutes the stop abutment for the second piston 50 and, by its position, defines the correct rest position thereof, with the interposition of the shims 94 inserted between the collar of the ring nut 90, which is inside the body 12, and the end of the cylinder body.

Figure 2:
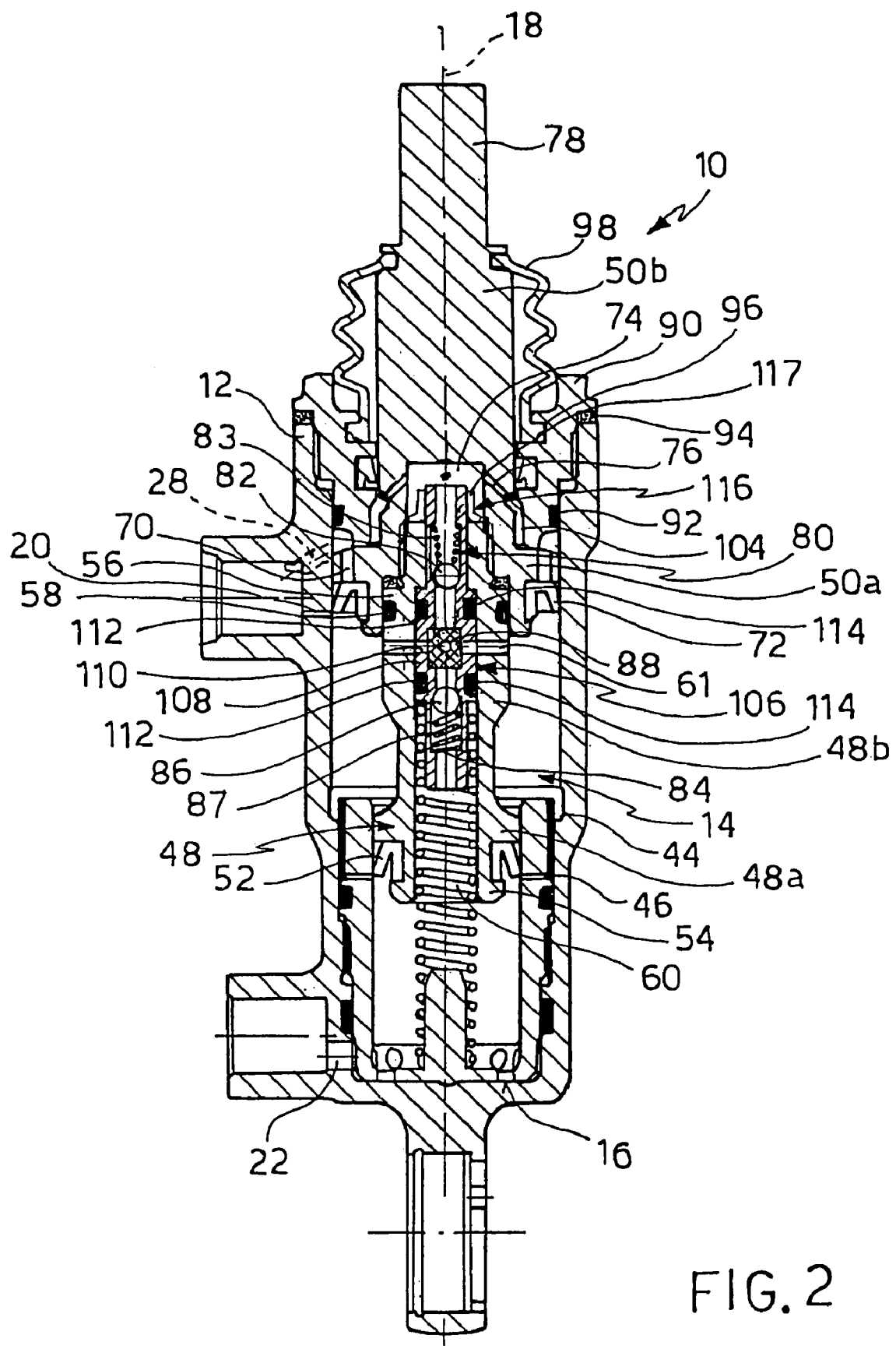
FIG. 2 shows a possible embodiment of the master cylinder of FIG. 1, also sectioned in a plane containing the axis of sliding of the piston and in rest conditions.
Figure 3:
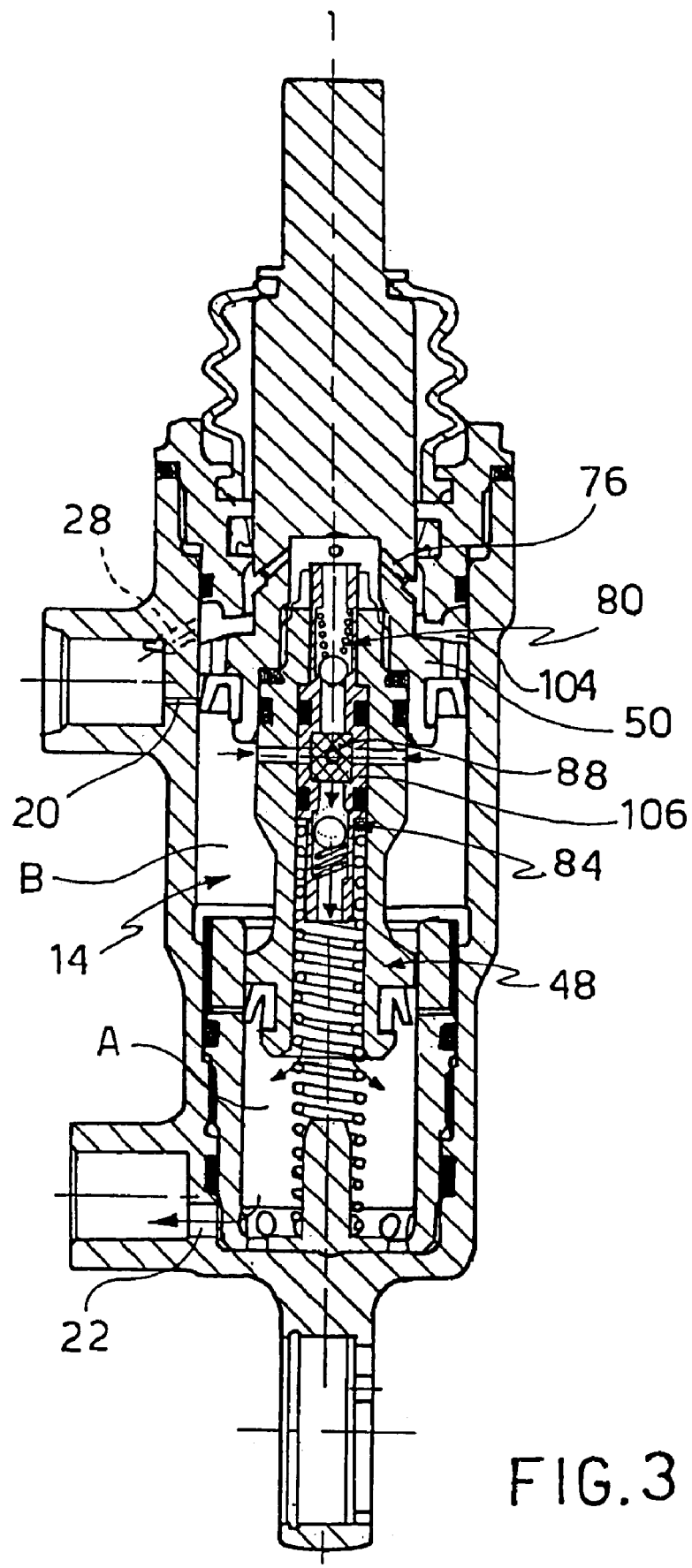
FIG. 3 shows the master cylinder of FIG. 2 in a different operative condition.
Figure 4:
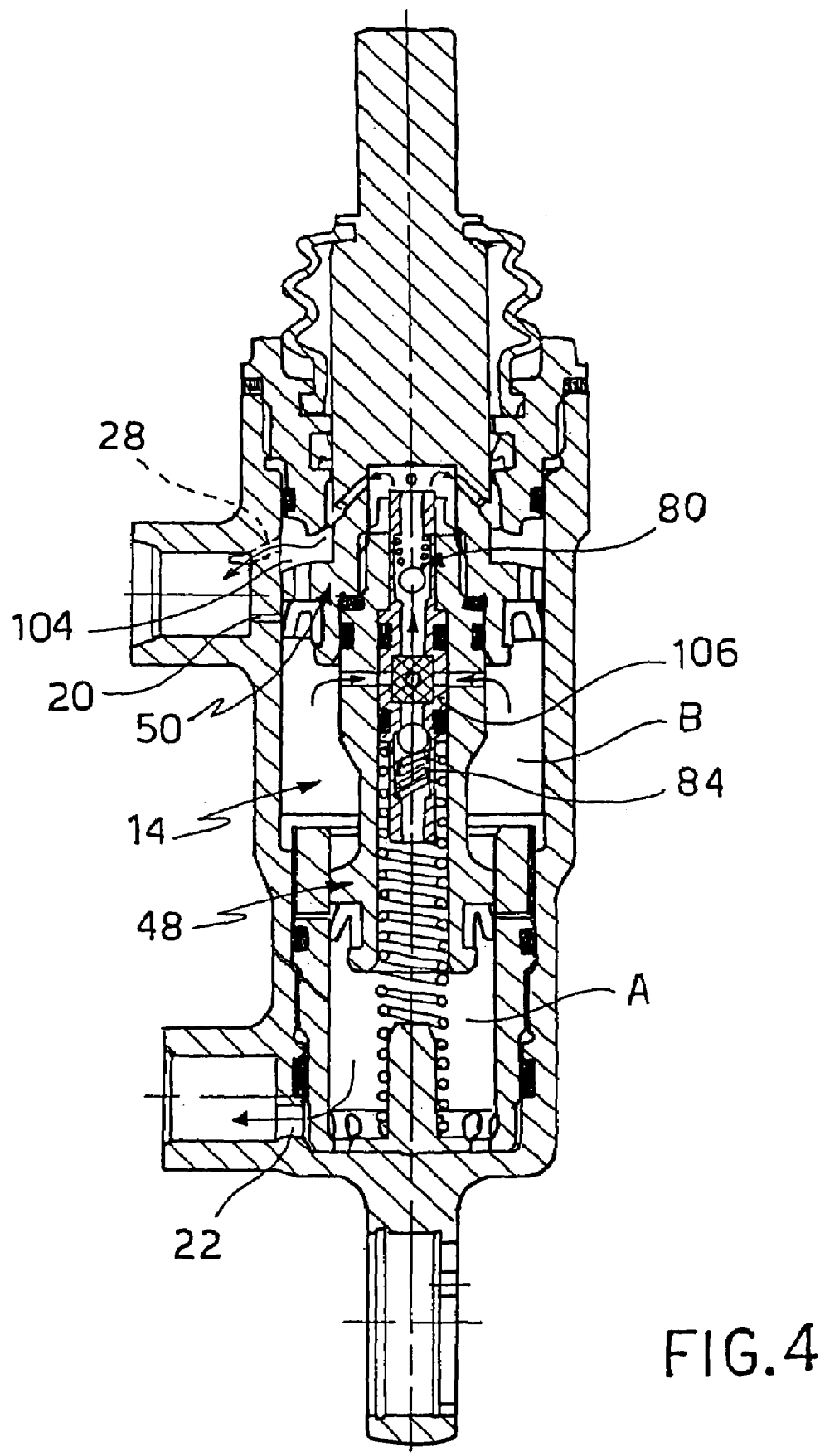
FIG. 4 shows the master cylinder of FIG. 2 in a further different operative condition.

A possible alternative embodiment of the cylinder is shown in rest conditions in FIG. 2. Elements which are similar to those of the embodiment of FIG. 1 are indicated by the same reference numerals.

The cylinder of FIG. 2 differs from that of FIG. 1 by the presence of an integrated block 106 housed inside the axial hole 60. The integrated block 106 comprises both the discharge valve 80 and the low-pressure valve 84, which are housed in a single cylindrical body 108 that can be fitted in the axial hole 60. The integrated block 106 is preferably suitable for being fitted in the first piston 48 from the end facing the base 16, in abutment with shoulders of the axial hole 60.

According to a possible embodiment, the integrated block 106 also comprises the filter 88 and radial ducts 110 which can be arranged in the region of the radial ducts 61.

According to a possible embodiment, the outer wall of the integrated block 106 has two seats 112, disposed on opposite sides of the radial ducts 110 and suitable for housing seals 114.

According to a possible embodiment, the integrated block 106 has means for securing to the interior of the piston in which it is housed. A threaded connection 116, for, example, with a nut 117, is formed at an end of the integrated block 106, projecting from the axial hole 60. The first piston 48 is hollow and houses the integrated block completely, allowing it to enter from one end and to be secured from the other. Preferably, as shown in FIG. 2, the integrated block 106 is inserted in the first piston 48 from the end facing the base 16 and is locked therein from the opposite end, that is from the end which is mounted in the second piston 50.

The discharge valve and the low-pressure valve may have characteristics similar to those described for the embodiment of FIG. 1.

Operation is described below with reference to FIGS. 2–5, that is, to a cylinder comprising an integrated block 106. The operation of the cylinder of FIG. 1 or of other equivalent variants is similar.

FIG. 2 shows the cylinder in the rest position corresponding to the condition in which no force is applied to the brake pedal. In this position, the return spring 66 urges the unit constituted by the first and second pistons against the ring nut which, as mentioned above, constitutes the stop abutment and hence defines its rest position.

The second chamber B is in communication with the inlet duct 20 by virtue of the position of the second piston, 50 and, in particular, of the second primary seal 72.

Moreover, the first chamber A is in communication with the radial holes 46 and the grooves 44, by virtue of the position of the first piston 48 and, in particular, of the first primary seal 52.

The low-pressure chamber B and the high-pressure chamber A are therefore in communication with one another and with the reservoir, and are consequently at ambient pressure.

If the brake is operated, that is, if a force is applied to the pedal operatively connected to the shank 78, the unit comprising the two pistons is caused to slide towards the base 16, along the longitudinal axis 18.

As soon as the second primary seal 72 passes beyond the inlet duct 20 (FIG. 3), the fluid starts to move towards the output duct 22 and towards the brake-actuating members, that is, the stage starts in which the pads approach the disc and the so-called "rollback" is taken up.

During this stage, the amount of fluid moved is equal to the cross-section of the second chamber B multiplied by the travel performed by the piston.

According to a possible embodiment, the slight overpressure p" which is established in the second chamber B is such as to open the low-pressure valve 84 so that the fluid passes from the second chamber B to the first chamber A through the radial holes 61, the low-pressure valve 84, and the axial hole 60. Naturally, the fluid also flows from the first chamber A to the brake through the output duct 22. According to a possible embodiment, the low-pressure valve is opened immediately, even at a pressure corresponding to ambient pressure.

It is therefore clear that, in this stage, the second piston and the respective second chamber, or low-pressure chamber B are active and that, by virtue of the larger diameter of the piston, it is possible to move larger quantities of fluid, whilst the travel both of the piston and of the brake pedal are kept short.

The chamber 104 is enlarged since it is now defined by the ring nut 90, by the thrust portion 50a of the second piston 50, and by the walls of the cavity 14. The chamber 104 is in communication with the ducts 28 and with the inlet duct 20, that is, with the brake-fluid reservoir. The pressure inside the chamber 104 is therefore equal to ambient pressure.

During the approach stage, the pressure in the first and second chambers is equal to a value which is less than the calibrated threshold pressure p' of the discharge valve 80 (for example, 5 bar) and which increases as the two pistons translate towards the base 16.

The approach stage terminates after a travel of the pistons of about 0.2 mm and corresponds substantially to the moment at which the pads come into contact with the disc and the actual braking stage starts. The start of this stage is characterized by the reaching and the exceeding of the calibration pressure p' of the discharge valve 80 (for example, 5 bar).

The opening of the discharge valve 80 (FIG. 4) puts the second chamber B into communication with the chamber 104 which is at ambient pressure, thus preventing the pressure in the second chamber B from increasing above the predetermined value. The opening of the discharge valve 80 thus creates a pressure difference between the second chamber B and the first chamber A, which tends to close the low-pressure valve 84 promptly.

The opening of the discharge valve 80 and the closure of the low-pressure valve 84, for example simultaneously, define the transition from the approach stage to the actual braking stage.

As the travel of the brake pedal continues, the pressure in the first chamber A increases, enabling the desired braking to be achieved. During this stage, the interior of the chamber 104 is at ambient pressure, the interior of the second chamber B is at the calibration or intervention pressure of the discharge valve 80 (for example, 5 bar) and the first chamber A is at the pressure necessary for braking.

Figure 5:
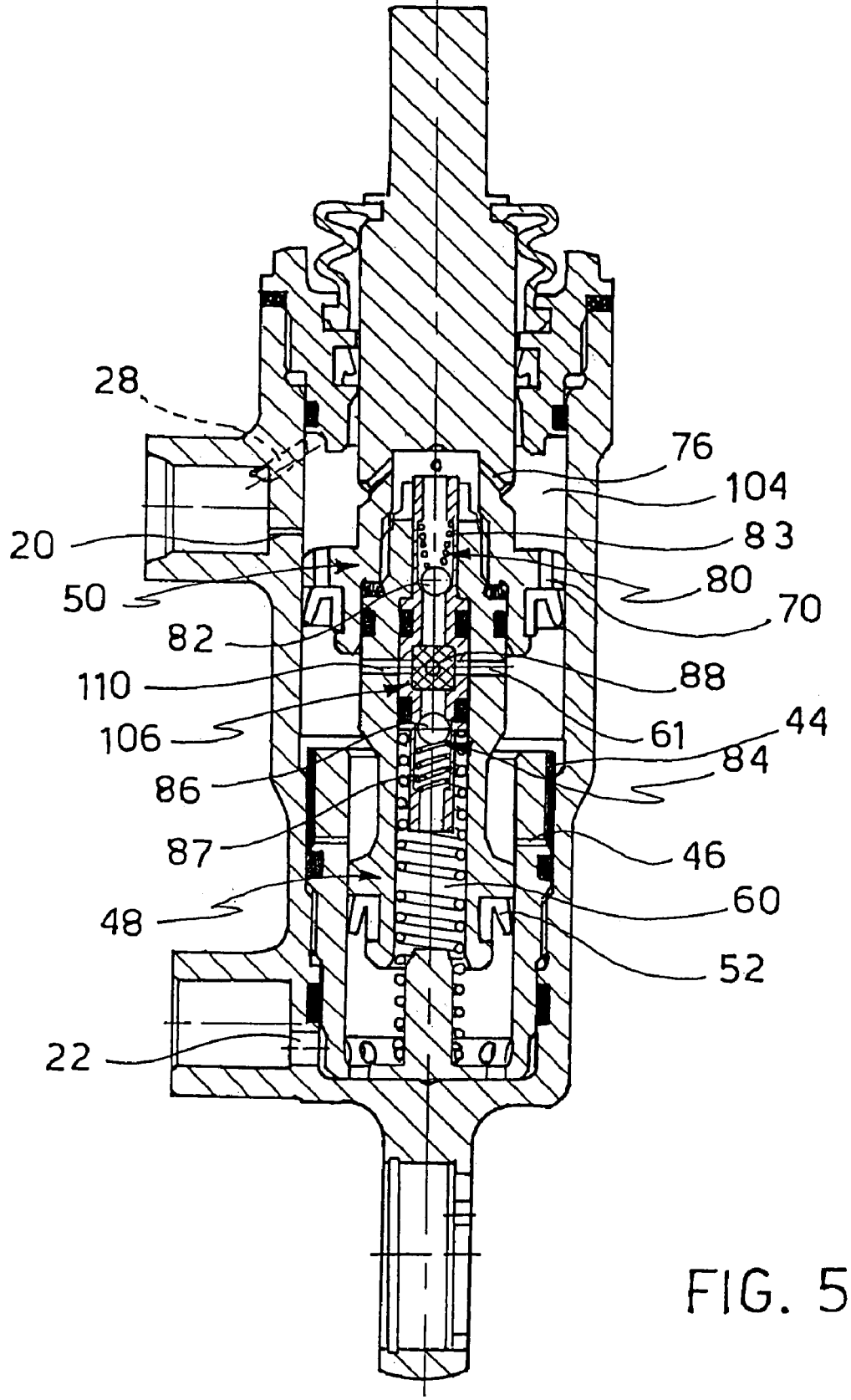
FIG. 5 shows the master cylinder of FIG. 2 in a further different operative condition substantially corresponding to the operative condition in which the pressure is that required by the braking.

FIG. 5 shows the positions of the parts of the cylinder during the braking stage.

The pressure difference between the first and second chambers ensures the necessary sealing of the first primary seal 52, consequently isolating the first chamber A from the second chamber B.

Upon completion of the braking, the brake pedal is released and the unit comprising the first and second pistons is pushed by the return spring 66 as far as the rest position.

When the rest position has been reached, the initial conditions shown in FIG. 2, in which the first chamber A is in communication with the second chamber B through the radial holes 46 and the grooves 44, and in which the second chamber B is in communication with the reservoir through the inlet duct 20, are re-established. The pressure is consequently discharged in both chambers which are therefore, at ambient pressure in the rest position of the cylinder.

It can be appreciated from the foregoing that the provision of a differential cylinder as described above satisfies the above-mentioned need to achieve different travels and pressures during the different braking stages without, however, introducing excessive bulkiness or great complexities of structure or assembly.

In particular, the maintenance of a diameter of the first chamber A which is the same as that of a single-diameter cylinder means that there is no change in the force to be applied to the pedal to achieve the braking action. Moreover, the provision of a second, larger-diameter chamber B which is active during the approach stage means that the necessary travel of the pedal during the approach stage is reduced proportionally.

The provision, between the two chambers, of valve means which are separate from the seal of the fist piston 48 enables the valve means to be arranged for a prompt response in the transition between the two stages. The low-pressure valve is opened immediately or substantially immediately, as soon as a pressure above ambient pressure is established. Moreover the valve is particularly prompt in closing as soon as a pressure difference is created between the high-pressure and low-pressure chambers.

A novel concept was that of providing a particularly simple and compact low-pressure valve which enables the discharge valve to be housed inside one of the pistons. Unusually, the presence of the valve means between the two chambers is not subordinated to a connection between the valve means and a region which is at ambient pressure. Moreover, by virtue of the structural and functional simplicity, a person skilled in the art is not obliged to position the first valve means, which deactivate the larger-dimensioned piston, in the cylinder body, considerably complicating the structure and the processing stages. The provision for the insertion of both of the valve means in one of the pistons and in particular in the first piston 48, limiting the more complex processing and assembly stages to that piston, is even more advantageous.

Moreover, the differential cylinder according to the present invention is particularly advantageous since its novel structure also enables known cylinders provided with discharge valves inside the piston to be modified easily whilst keeping the valve in its original position, avoiding complex operations in the cylinder body and large dimensions.

Furthermore, the position of the valve inside the first piston simplifies the general structure of the cylinder and does not further increase its size.

The above-mentioned valve is also particularly reliable both in opening and in closure, since this is its principal function, and eliminates sensations of a "step", during the operation of the brake pedal, in the transition between the approach stage and the actual braking stage.

Moreover, the provision of both of the valve means inside an integrated block simplifies the production and assembly stages, ensuring correct positioning of the valve means relative to one another.

Naturally variants and/or additions may be provided for the embodiments described and illustrated above.

Figure 6:
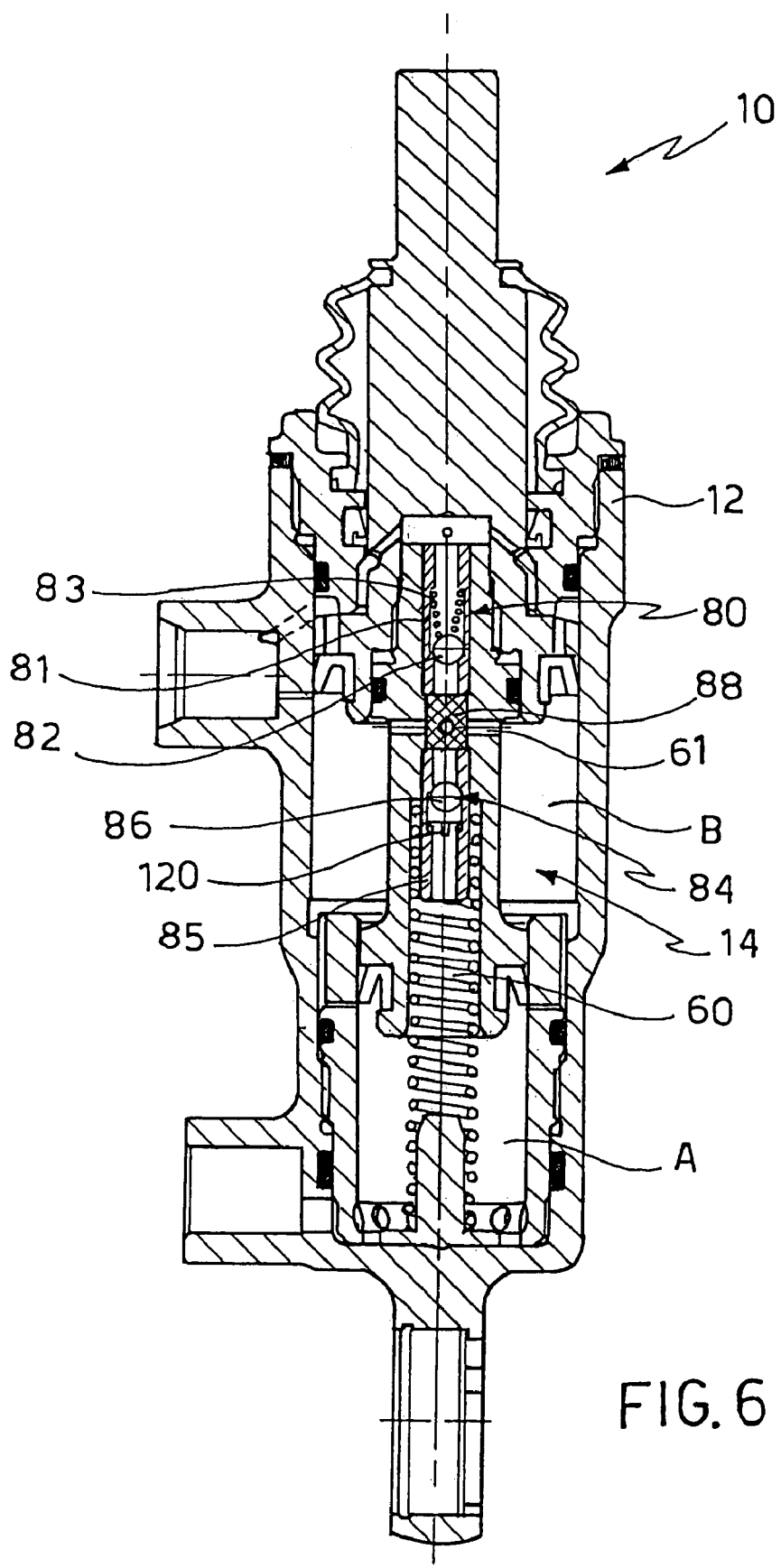
FIG. 6 shows a possible embodiment of the master cylinder of FIG. 1, also sectioned in a plane containing the axis of sliding of the piston.

The low-pressure valve comprises a spring having very low stiffness, the presence of which renders the positioning of the respective sphere more reliable both during closure and during opening. However, it is possible for the low-pressure valve not to have the spring and for the sphere to be positioned during closure and during opening purely by the effect of the pressure difference between the high-pressure and low-pressure chambers (FIG. 6). In this case, grooves 120 may be provided in the seat which houses the valve-closure element to permit the flow of the liquid when the valve is opened.

In particular, the low-pressure valve may be arranged to be already open when the two pistons start to translate. In contrast with what is shown in FIGS. 1 to 5, both the discharge valve and the low-pressure valve may be assembled directly inside the axial hole 60. A closure member is, for example, screwed, to the inner surface of the axial hole 60 to restrain the valve-closure element and any spring of the valve.

In contrast with what is described above, both the discharge valve 80 and the low-pressure valve 84 may be housed inside the second piston 50, particularly when the shape of the two pistons is different.

The first chamber A may be formed directly in the cylinder body 12, eliminating the bush 30 and the processing thereof and the seals for its installation in the cylinder body 12. The grooves 44 may consequently be formed in the wall of the cavity 14 in the vicinity of the transition between the first and second chambers.

This further embodiment permits a saving in the material of the body 12. It also retains the same ease of production of the cylinder body, and the same piston unit as was described for the previous embodiments. In addition to the foregoing, when the optimal configuration for a predetermined application has been achieved, savings can be made in parts and processing.

Figure 7:
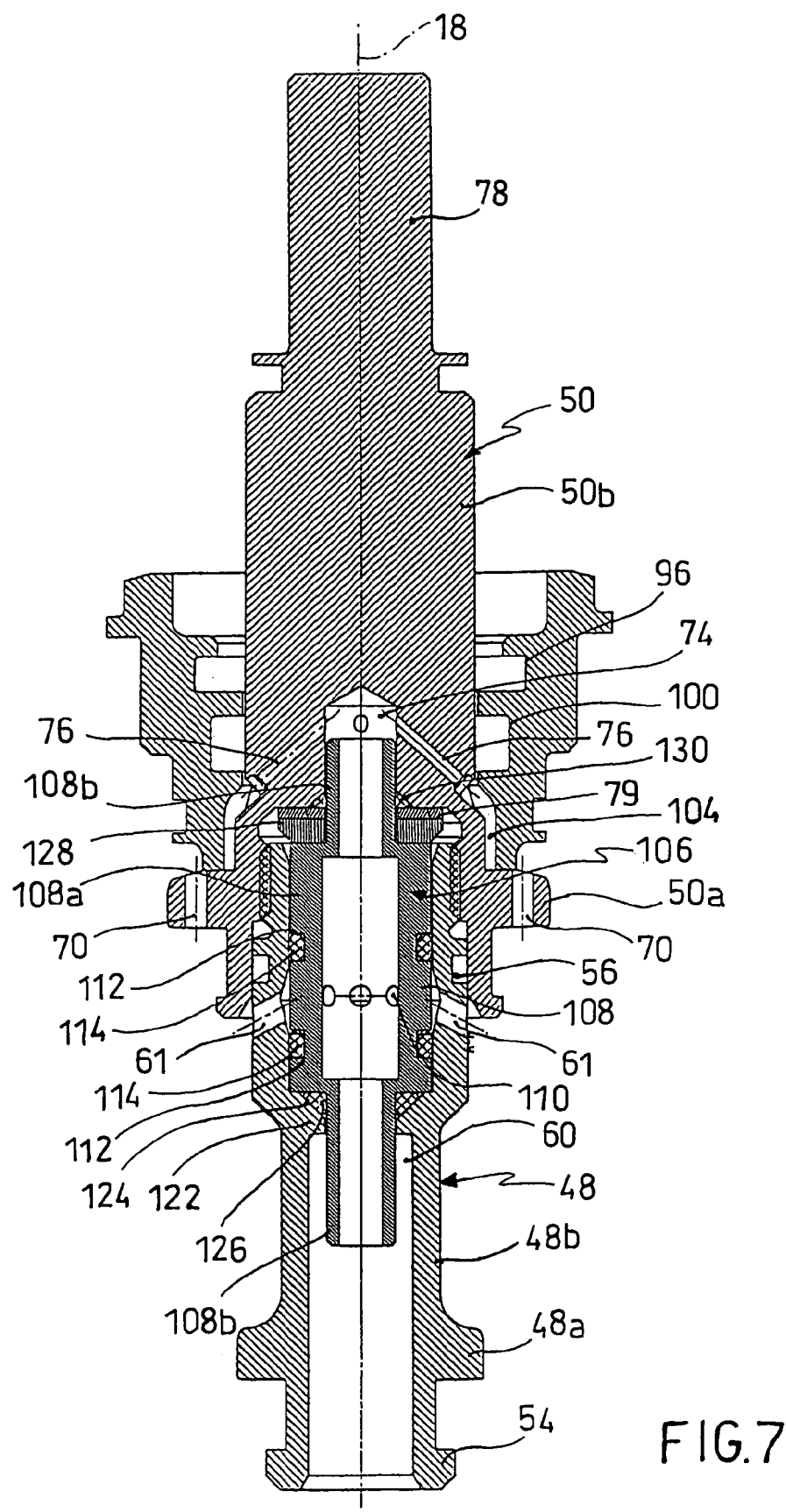
FIG. 7 shows a possible further embodiment of a detail of the master cylinder of FIG. 1 or FIG. 2.

Finally, FIG. 7 shows a possible embodiment of a detail of the cylinder in which the elements in common with the embodiments already described are indicated by the same reference numerals. The detail of FIG. 7 relates to the first piston 48, to the second piston 50, and to the integrated block 106. The spheres, the resilient elements, and any filter inside the integrated block 106 are not shown since they correspond substantially to those illustrated and described for the previous embodiments.

The first piston 48 is intended to slide inside the bush 30, if a bush is present, and the second piston 50 is intended to slide inside the second, larger-diameter portion of the cavity 14.

According to one possible embodiment, the first piston 48 is formed, in a single piece, by the thrust portion 48a and by the rod 48b. The thrust portion 48a has a flange-shaped head having transverse dimensions substantially corresponding to the inside transverse dimensions of the bush 30, if a bush is present.

A seat is also provided for housing sealing means, for example, formed by a first primary seal, not shown, restrained by a ring or by an undercut 54, in similar manner to the primary seal 52 described above.

According to a possible embodiment, the rod 48b has, at the end remote from the thrust portion 48a, a portion suitable for coupling with the second piston 50.

Externally and in a direction away from the thrust portion 48a, this coupling portion comprises a threaded portion, and the seat 56 for a sealing ring 58, which is not illustrated but is similar to the sealing ring 58 described above.

According to a possible embodiment, the rod 48b is hollow axially, that is, it has an axial hole 60 which extends throughout its length and is open at both ends.

According to a possible embodiment, the rod 48b further comprises ducts 61 which extend through the thickness of the first piston between the axial hole 60 and the exterior of the first piston. According to a possible embodiment, the ducts 61 are inclined to a radial direction.

According to a possible embodiment, the second piston 50 is formed, in a single piece, by the thrust portion 50a and by the rod 50b. The thrust portion 50a comprises a flange-shaped head having transverse dimensions substantially corresponding to the transverse dimensions of the second portion of the cavity 14. Axial through-holes formed in the thrust portion 50a of the second piston 50 are indicated 70.

A second primary seal, not illustrated, but similar to the second primary seal 72 described above, is housed in a seat of the thrust portion 50a of the second piston 50, in contact with one end of each axial hole 70 and arranged in a manner such as to adhere to the walls of the cavity 14.

According to a possible embodiment, the axial hole 74 having portions with different diameters for housing the coupling portion of the first piston 48 is formed in the head which constitutes the thrust portion 50a. According to the embodiment shown in FIG. 7, there may be a first cylindrical portion for cooperating with the sealing ring of the first piston 48, a threaded portion for cooperating with the corresponding threaded portion of the first piston 48, and a second cylindrical portion which terminates in a base surface.

The ducts 76 which extend through the whole thickness of the wall of the rod 50b, opening outside it, extend from the second cylindrical portion of the axial hole 74.

According to a possible embodiment, the shank 78, for example, a threaded shank for coupling with the control pedal, is provided at the end remote from the thrust portion 50a.

According to a possible embodiment, the first piston 48 and the second piston 50 are fixed firmly to one another, as shown, for example, in FIG. 7. When the two pistons are assembled, shims 79 may be interposed between the two pistons so as to define their relative positions precisely. This relative position depends on the distance between the inlet duct 20 and the radial ducts 46.

As shown in FIG. 7, when the two pistons are assembled, the axial hole 60 opens into the base portion of the axial hole 74 and is put into communication with the ducts 76.

FIG. 7 also shows the ring nut 90 which restrains and guides the two pistons, and which is substantially similar to that illustrated and described above.

The integrated block 106 is housed inside the first piston, in particular inside the axial hole 60, and is preferably inserted from the end of the first piston 48 which is mounted on the second piston 50. Shoulders 122 on the internal wall of the axial hole 60 constitute abutment elements for the integrated block 106. Optionally, these shoulders 122 may be formed with inclined walls 124 suitable for housing a seal 126.

The integrated block 106 comprises both the discharge valve 80 and the low-pressure valve 84, which are housed in the cylindrical body 108 that can be fitted in the axial hole 60. The arrangement of the two valves is similar to that shown in FIG. 2.

According to a possible embodiment, the integrated block 106 also comprises the filter, arranged between the two valves as shown in FIG. 2. The integrated block 106 also comprises radial ducts 110 which can be arranged in the region of or in communication with the ducts 61.

According to a possible embodiment, the outer wall of the integrated block 106 has two seats 112, disposed on opposite sides of the radial ducts 110 and suitable for housing seals 114.

The cylindrical body 108, both in the embodiment of FIG. 7 and in that of FIG. 2, advantageously has a central portion 108a having transverse dimensions substantially corresponding to those of the axial hole 60 and two end portions 108b with transverse dimensions shorter than those of the central portion. According to a possible embodiment, the end portion 108b which is disposed at the end at which the first piston 48 is fixed to the second piston 50 projects from the first piston 48. According to a possible embodiment, the base portion of the axial hole 74 has transverse dimensions substantially similar to those of the end portion 108b so as to house and guide it.

In the embodiment of FIG. 7, the integrated block is fitted in the first piston 48 and held in position by the presence of the second piston 50, when the second piston 50 is screwed to the first.

Advantageously, there are inserted between the integrated block 106 and the second piston 50 shims 79 and possibly a spacer 128 which increases the interaction surface between the second piston 50 and the integrated block 106. Even more advantageously, the shims 79 and any spacer 128 are of annular shape and can be fitted around the respective end portion 108b of the integrated block 106.

The first piston 48 is hollow and houses the integrated block 106 completely, allowing it to enter and to be secured from the end which faces the second piston 50.

A further sealing ring 130 may be provided between the second piston 50 and the integrated block 106 or the shims 79 with any spacer 128.

In order to satisfy contingent and specific requirements, a person skilled in the art may apply to the above-described preferred embodiment of the master cylinder many modifications, adaptations and replacements of elements with other functionally equivalent elements without, however, departing from the scope of the appended claims.

The invention claimed is:

1. A master cylinder for a vehicle braking system, comprising:
a cylinder body inside which a first chamber and a second chamber are provided, the first chamber being in operative communication with at least one braking member of said braking system, the second chamber having larger transverse dimensions than the first chamber and being in operative communication with the first chamber, said cylinder further comprising a first piston housed inside the first chamber and provided with sealing means for sealing against the walls of the first chamber and a second piston housed inside the second chamber and having larger transverse dimensions than the first piston, the cylinder further comprising first valve means which can open when the pressure inside the second chamber reaches a predetermined threshold value, the cylinder further comprising ducts which can put the first chamber and the second chamber into communication and are formed at least partially inside the first piston, said ducts housing further valve means which are separate from the sealing means and suitable for closing when the pressure inside the first chamber is greater than the pressure inside the second chamber, both the valve means and the further valve means being housed inside the first piston or the second piston, the further valve means comprising a low-pressure valve provided with an independent cylinder which is suitable for being fitted in the ducts and inside which a valve-closure element is provided.

2. A master cylinder according to claim 1 in which the further valve means is suitable for opening when the pressure inside the second chamber reaches a predetermined threshold value.

3. A master cylinder according to claim 1 in which the ducts which are suitable for putting the first chamber and the second chamber into communication are formed inside at least one of the first piston and the second piston.

4. A master cylinder according to claim 3 in which said ducts which are suitable for putting the first chamber and the second chamber into communication are formed inside a rod of the first piston.

5. A master cylinder according to claim 4 in which the ducts which are suitable for putting the first chamber and the second chamber into communication comprise an axial duct which extends along an axis of the first piston and ducts which put the axial duct into communication with the second chamber.

6. A master cylinder according to claim 1 in which the low-pressure valve is provided with a valve-closure element housed in the first piston and restrained by a closure member.

7. A master cylinder according to claim 6 in which the low-pressure valve is fitted in the first piston, coaxially therewith.

8. A master cylinder according to claim 6 in which the low-pressure valve comprises a resilient element which is housed inside the first piston and restrained by the closure member, and which is suitable for acting on the valve-closure element in order to keep the low-pressure valve in the closed position.

9. A master cylinder according to claim 1 in which the low-pressure valve comprises a resilient element which is housed inside the cylinder and which can act on the valve-closure element in order to keep the low-pressure valve in the closed position.

10. A master cylinder according to claim 1 in which the first valve means comprise a discharge valve which is suitable for being activated upon the reaching of a predetermined pressure of the fluid provided inside the second chamber, in order to deactivate the effect of the second piston.

11. A master cylinder according to claim 1 in which the first valve means and the further valve means are fitted in an integrated block.

12. A master cylinder according to claim 11 in which the integrated block can be housed in an axial hole of the first piston.

13. A master cylinder according to claim 11 in which the integrated block comprises means for securing to the interior of the piston in which the block is housed.

14. A master cylinder according to claim 13 in which the securing means comprise a threaded connection with a nut screwed on an end of the integrated block projecting from the piston which houses it.

15. A master cylinder according to claim 11 in which the integrated block is housed in the first piston and in which the second piston locks the integrated block inside the first piston.

16. A master cylinder according to claim 15 in which shims are inserted between the integrated block and the second piston.

17. A master cylinder according to claim 16 in which the shims are of annular shape and are suitable for being fitted around a respective end portion of the integrated block.

18. A master cylinder according to claim 15 in which a spacer is inserted between the integrated block and the second piston.

19. A master cylinder according to claim 18 in which the spacer is of annular shape and is suitable for being fitted around a respective end portion of the integrated block.

20. A master cylinder according to claim 15 in which the integrated block compnses an end portion suitable for being housed in a cylindrical hole of the second piston having transverse dimensions substantially corresponding to the transverse dimensions of the end portion.

21. A master cylinder according to claim 15 in which the integrated block is suitable for being fitted in the first piston from the end which faces the second piston.

22. A master cylinder according to claim 1 in which a filter is provided, inserted in the ducts.

23. A master cylinder according to claim 22 in which the filter is interposed between the second chamber and the further valve means.

24. A master cylinder according to claim 22 in which the filter is inserted in an integrated block comprising the further valve means.

25. A master cylinder according to claim 24 in which the integrated block comprises means for securing to the interior of the piston in which the block is housed.

26. A master cylinder according to claim 25 in which the securing means comprise a threaded connection with a nut screwed on an end of the integrated block projecting from the piston which houses it.

27. A master cylinder according to claims 11 or 24 in which the integrated block comprises said valve means, said further valve means, and the filter interposed between the valve means and the further valve means.

28. A master cylinder according to claim 1 in which the further valve means can be opened upon the reaching of a pressure of the fluid provided inside the second chamber, equal to a threshold value of about 0.1 bar.

29. A master cylinder according to claim 1 in which the valve means can be opened upon the reaching of a pressure of the fluid provided inside the second chamber, equal to about 5 bar.

30. A master cylinder according to claim 1 in which the first chamber and the second chamber extend along the same longitudinal axis of the body.

31. A master cylinder according to claim 1 in which the first piston and the second piston are constituted by two separate elements fixed firmly to one another.

32. A master cylinder according to claim 31 in which the first piston and the second piston are screwed together.

33. A master cylinder for a vehicle braking system, comprising: a cylinder body inside which a first chamber and a second chamber are provided, the first chamber being in operative communication with at least one braking member of said braking system, the second chamber having larger transverse dimensions than the first chamber and being in operative communication with the first chamber, said cylinder further comprising a first piston housed inside the first chamber and provided with sealing means for sealing against the walls of the first chamber and a second piston housed inside the second chamber and having larger transverse dimensions than the first piston, the cylinder further comprising first valve means which can open when the pressure inside the second chamber reaches a predetermined threshold value, the cylinder further comprising ducts which can put the first chamber and the second chamber into communication and are formed at least partially inside the first piston, said ducts housing further valve means which are separate from the sealing means and suitable for closing when the pressure inside the first chamber is greater than the pressure inside the second chamber, the valve means and the further valve means being inserted in an integrated block.

34. A master cylinder according to claim 33 in which the integrated block can be housed in an axial hole of the first piston.

35. A master cylinder according to claim 33 in which the integrated block comprises means for securing to the interior of the piston in which the block is housed.

36. A master cylinder according to claim 35 in which the securing means comprise a threaded connection with a nut screwed on an end of the integrated block projecting from the piston which houses it.

37. A master cylinder according to claim 33 in which the integrated block is housed in the first piston and in which the second piston locks the integrated block inside the first piston.

38. A master cylinder according to claim 37 in which shims are inserted between the integrated block and the second piston.

39. A master cylinder according to claim 38 in which the shims are of annular shape and are suitable for being fitted around a respective end portion of the integrated block.

40. A master cylinder according to claim 37 in which a spacer is inserted between the integrated block and the second piston.

41. A master cylinder according to claim 40 in which the spacer is of annular shape and is suitable for being, fitted around a respective end portion of the integrated block.

42. A master cylinder according to claim 37 in which the integrated block comprises an end portion suitable for being housed in a cylindrical hole of the second piston having transverse dimensions substantially corresponding to the transverse dimensions of the end portion.

43. A master cylinder according to claim 37 in which the integrated block is suitable for being fitted in the first piston from the end which faces the second piston.

44. A master cylinder according to claim 33 in which a filter is provided, inserted in the ducts.

45. A master cylinder according to claim 44 in which the filter is interposed between the second chamber and the further valve means.

46. A master cylinder according to claim 44 in which the filter is inserted in the integrated block.

47. A master cylinder according to claim 46 in which the integrated block comprises means for securing to the interior of the piston in which the block is housed.

48. A master cylinder according to claim 47 in which the securing means comprise a threaded connection with a nut screwed on an end of the integrated block projecting from the piston which houses it.

49. A master cylinder according to claim 33 in which the further valve means can be opened upon the reaching of a pressure of the fluid provided inside the second chamber, equal to a threshold value of about 0.1 bar.

50. A master cylinder according to claim 33 in which the valve means can be opened upon the reaching of a pressure of the fluid provided inside the second chamber, equal to about 5 bar.

51. A master cylinder according to claim 33 in which the first chamber and the second chamber extend along the same longitudinal axis of the body.

52. A master cylinder according to claim 33 in which the first piston and the second piston are constituted by two separate elements fixed firmly to one another.

53. A master cylinder according to claim 52 in which the first piston and the second piston are screwed together.

* * * * *